(12) United States Patent
Bak et al.

(10) Patent No.: US 6,738,969 B2
(45) Date of Patent: May 18, 2004

(54) NON-INTRUSIVE GATHERING OF CODE USAGE INFORMATION TO FACILITATE REMOVING UNUSED COMPILED CODE

(75) Inventors: Lars Bak, Tranbjerg J. (DK); Jacob R. Andersen, Aarhus C. (DK); Kasper V. Lund, Aarhus C. (DK)

(73) Assignee: Sun Microsystems, Inc., Santa Clara, CA (US)

( * ) Notice: Subject to any disclaimer, the term of this patent is extended or adjusted under 35 U.S.C. 154(b) by 145 days.

(21) Appl. No.: 10/121,875

(22) Filed: Apr. 12, 2002

(65) Prior Publication Data

US 2003/0093777 A1 May 15, 2003

Related U.S. Application Data

(60) Provisional application No. 60/332,925, filed on Nov. 14, 2001.

(51) Int. Cl.⁷ .................................................. G06F 9/45
(52) U.S. Cl. .................... 717/158; 717/139; 717/148
(58) Field of Search ................................. 717/153, 114, 717/116, 118, 136, 139, 140, 145, 148, 151–167; 709/1, 310, 315, 328, 331, 332; 718/1; 719/310, 315, 328, 331–332

(56) References Cited

U.S. PATENT DOCUMENTS

| | | | | |
|---|---|---|---|---|
| 5,752,038 A | * | 5/1998 | Blake et al. | 717/158 |
| 5,933,635 A | | 8/1999 | Holzle et al. | 717/151 |
| 6,463,582 B1 | | 10/2002 | Lethin et al. | 717/158 |
| 2002/0100018 A1 | * | 7/2002 | Click et al. | 717/124 |
| 2003/0028686 A1 | | 2/2003 | Schwabe et al. | 709/332 |

OTHER PUBLICATIONS

White–Gartwaite, The GC Interface in the EVM, Dec. 1998, Sun Microsystems, M/S MTV29–01.*
Publication entitled "A New Approach for Java in Embedded Networks", by Wolfgang Kastner et al., 2000 IEEE, Sep. 6–8, Porto, Portugal, pp. 19–26.
Publicaton entitled "A Dynamic Optimization Framework for a Java Just–In–Time Compiler", by Toshio Suganuma et al., XP–002229562, ACM OOPSCA 2001, http://oopsla.acm.otg/oopsla20001/, pp. 180–194.
Publication entitled "Generic Hardware Debugging Mechanisms", XP–002229563, pp. 40–43.

* cited by examiner

Primary Examiner—Anthony Nguyen-Ba
(74) Attorney, Agent, or Firm—Park, Vaughan & Fleming LLP

(57) ABSTRACT

One embodiment of the present invention provides a system that gathers code usage information to facilitate removing compiled code that has not been recently used. This method operates in a mixed-mode system that supports execution of both compiled code and interpreter code. During operation, the system gathers usage information for compiled methods within an application while the application is executing. Next, the system identifies compiled methods to be removed based on this usage information, and removes identified compiled methods so that interpreter code is executed for the compiled methods instead of compiled code. In this way, the system frees up the memory space used to store the compiled methods.

24 Claims, 4 Drawing Sheets

AGE_3: NOP
AGE_2: NOP
AGE_1: NOP
AGE_0: RESTORE INSTRUCTION 211

NON-INTRUSIVE GATHERING OF CODE USAGE INFORMATION TO FACILITATE REMOVING UNUSED COMPILED CODE

RELATED APPLICATION

This application hereby claims priority under 35 U.S.C. §119 to U.S. Provisional Patent Application No. 60/332,925, filed on Nov. 14, 2001, entitled "Improving Performance In Virtual Machines," by inventors Lars Bak, Jacob R. Andersen, Kasper V. Lund and Steffen Grarup.

BACKGROUND

1. Field of the Invention

The present invention relates to compilers for computer systems. More specifically, the present invention relates to a method and an apparatus that non-intrusively gathers code usage information to facilitate removing compiled code in a mixed-mode system that supports execution of both compiled code and interpreter code.

2. Related Art

The exponential growth of the Internet has in part been fueled by the development of computer languages, such as the JAVA™ programming language distributed by Sun Microsystems, Inc. of Palo Alto, Calif. The JAVA programming language allows an application to be compiled into a module containing platform-independent bytecodes, which can be distributed across a network of many different computer systems. Any computer system possessing a corresponding platform-independent virtual machine, such as the JAVA virtual machine, is then able to execute the bytecodes. In this way, a single form of the application can be easily distributed to and executed by a large number of different computing platforms.

When an application is received in platform-independent form, it can be interpreted directly through an interpreter, or alternatively, it can be compiled into machine code for the native architecture of the computing platform. Machine code typically executes significantly faster than interpreter code. However, compiled code occupies considerably more space than interpreter code. Hence, the determination of whether or not to compile interpreter code depends on the relative importance of memory space to execution speed.

Some "mixed-mode" computer systems support execution of both compiled code and interpreter code. On a mixed-mode system, it is often desirable to eliminate a compiled method in order to free up memory space. However, existing mixed-mode systems can only unload a compiled method when the entire class associated with the compiled method is unloaded. This means that a large number of compiled methods associated with a class can potentially build up in memory before the class is unloaded. This is not a problem in larger computer systems, which have more memory to store compiled methods, and which can rely on the virtual memory system to migrate unused compiled methods to swap space in secondary storage.

However, constrained memory systems, such as pocket-sized computing devices, have limited memory space to accommodate compiled methods, and typically do not provide swap space in secondary storage for the virtual memory system.

Hence, what is needed is a method and an apparatus for removing an unused compiled method from memory without having to wait for the entire class associated with the compiled method to be unloaded.

SUMMARY

One embodiment of the present invention provides a system that gathers code usage information to facilitate removing compiled code that has not been recently used. This method operates in a mixed-mode system that supports execution of both compiled code and interpreter code. During operation, the system gathers usage information for compiled methods within an application while the application is executing. Next, the system identifies compiled methods to be removed based on this usage information, and removes identified compiled methods so that interpreter code is executed for the compiled methods instead of compiled code. In this way, the system frees up the memory space used to store the compiled methods.

In a variation on this embodiment, the system is part of a garbage collection mechanism that removes unreachable objects from the memory space of the application in addition to removing compiled methods.

In a variation on this embodiment, gathering the usage information involves keeping track of how many times each compiled method has been garbage collected without being executed. Furthermore, identifying the compiled methods to be removed involves identifying compiled methods that have been garbage collected more than a threshold number of times without being executed.

In a variation on this embodiment, the system keeps track of how many times a given compiled method has been garbage collected by replacing an instruction in the given compiled method with a trap instruction that causes the instruction to be restored to replace the trap instruction when the given method is executed after garbage collection. If the instruction has not been replaced since a preceding garbage collection operation, the system increments a counter associated with the trap instruction so that the counter indicates how many times the given method has been garbage collected without being executed.

In a further variation, the counter is stored in a pointer associated with the trap instruction so that additional memory space is not required to store the counter.

In a variation on this embodiment, if a given compiled method to be removed describes an activation record that is active on the execution stack, the system de-optimizes the activation record, which involves converting the activation record from being described by the given compiled method to being described by the interpreter.

In a variation on this embodiment, if a given compiled method to be removed describes an activation record that is active on the execution stack, the system does not remove the given compiled method, thereby avoiding the expense of de-optimizing the activation record.

In a variation on this embodiment, the system additionally determines a total amount of memory used by compiled methods, and then removes compiled methods if the total amount of memory used by compiled methods exceeds a threshold value.

In a variation on this embodiment, the system additionally determines a total amount of memory used by live user data, and then removes compiled methods if the total amount of memory used by live user data exceeds a threshold value, thereby freeing additional memory space to accommodate live user data.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
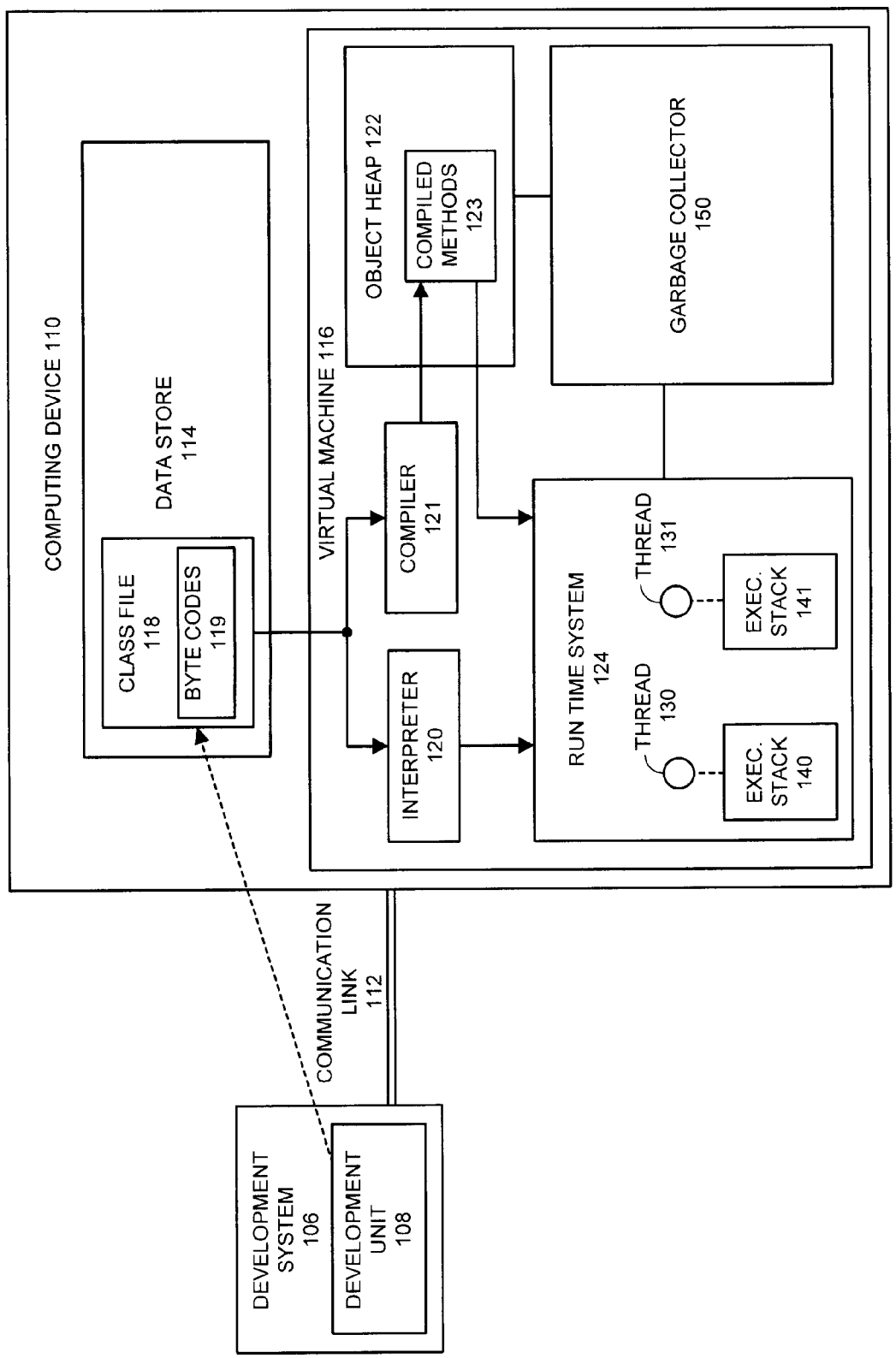
FIG. 1 illustrates a computing device in accordance with an embodiment of the present invention.

FIG. 1 illustrates a computing device 110 coupled to a development system 106 in accordance with an embodiment of the present invention. Development system 106 can generally include any type of computer system, including, but not limited to, a computer system based on a microprocessor, a mainframe computer, a digital signal processor, a portable computing device, a personal organizer, a device controller, or a computational engine within an appliance. Development system 106 contains development unit 108, which includes programming tools for developing platform-independent applications. This generally involves compiling an application from source code form into a platform-independent form, such as JAVA bytecodes.

Development system 106 is coupled to computing device 110 through a communication link 112. Computing device 110 can include any type of computing device or system including, but not limited to, a mainframe computer system, a server computer system, a personal computer system, a workstation, a laptop computer system, a pocket-sized computer system, a personal organizer or a device controller. Computing device 110 can also include a computing device that is embedded within another device, such as a pager, a cellular telephone, a television, an automobile, or an appliance.

Communication link 112 can include any type of permanent or temporary communication channel that may be used to transfer data from development system 106 to computing device 110. This can include, but is not limited to, a computer network such as an Ethernet, a wireless communication link or a telephone line.

Computing device 110 includes data store 114, for storing code and data. Computing device 110 also includes virtual machine 116 for processing platform-independent applications retrieved from data store 114.

During the development process, a class file 118 is created within development unit 108. Class file 118 contains components of a platform-independent application to be executed in computing device 110. For example, class file 118 may include methods and fields associated with an object-oriented class. Note that these methods are specified using platform-independent bytecodes 119.

Next, class file 118 is transferred from development unit 108, through communication link 112, into data store 114 within computing device 110. This allows virtual machine 116 to execute an application that makes use of components within class file 118. Note that virtual machine 116 can generally include any type of virtual machine that is capable of executing platform-independent code, such as the JAVA VIRTUAL MACHINE™ developed by SUN Microsystems, Inc. of Palo Alto Calif. (Sun, Sun Microsystems, Java and Java Virtual Machine are trademarks or registered trademarks of Sun Microsystems, Inc. in the United States and other countries.)

Virtual machine 116 includes object heap 122 for storing objects that are manipulated by code executing on virtual machine 116. Object heap 122 also stores compiled methods 123.

Virtual machine 116 also includes an interpreter 120, which interprets platform-independent bytecodes 119 retrieved from data store 114 to facilitate program execution. During operation, interpreter 120 generally translates one bytecode at a time as bytecodes 119 are continuously read into interpreter 120.

Alternatively, virtual machine can use compiler 121 to compile methods from bytecode form into machine code form to produce compiled methods 123, which are stored in object heap 122.

Note that the interpreter code equivalent of a compiled method can be retrieved again at any time from data store 114. Virtual machine 116 includes a runtime system 124. Runtime system 124 maintains state information for threads 130–131. This state information includes execution stacks 140–141, respectively. Execution stacks 140–141 store activation records for methods being executed by threads 130–131, respectively.

Runtime system 124 can either execute code that is received from interpreter 120, or compiled methods 123 received from object heap 122. When a method is invoked by virtual machine 116, the system first determines if the method is to be invoked as an interpreted method. If so, runtime system 124 obtains the method from interpreter 120.

If, on the other hand, the system determines that the method is to be invoked as a compiled method, runtime system 124 activates compiler 121, which generates machine code instructions from the bytecodes. These machine code instructions are subsequently executed by runtime system 124.

Virtual machine also includes garbage collector 150, which periodically reclaims unused storage from object heap 122.

Trap Instruction

Figures 2A, 2B:
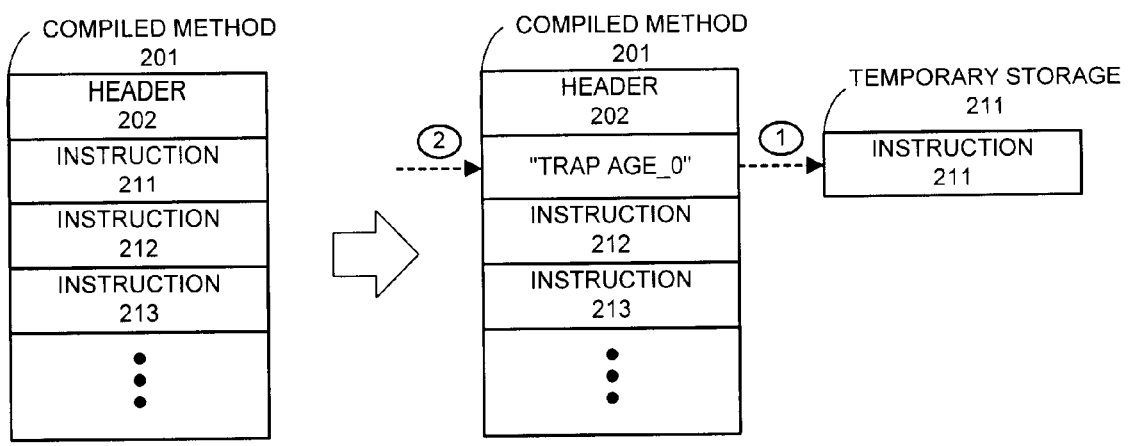
FIG. 2A illustrates how a compiled method is modified with a trap instruction in accordance with an embodiment of the present invention.
FIG. 2B illustrates code for a trap handler associated with the trap instruction in accordance with an embodiment of the present invention.

FIG. 2A illustrates how a compiled method 201 is modified with a trap instruction in accordance with an embodiment of the present invention. The left-hand side of FIG. 2A illustrates a compiled method 201, which is stored as an object within object heap 122. Hence, compiled method 201 includes an object header 202 as well as a set of instructions 211–213.

As is illustrated on the right-hand side of FIG. 3, compiled method 201 is modified by first saving instruction 211 from the entry point of compiled method 201 to temporary storage 204. Second, a trap instruction to location AGE_0 is stored in place of instruction 211 at the entry point of the compiled method.

FIG. 2B illustrates code for a trap handler associated with the trap instruction in accordance with an embodiment of the present invention. This code includes a number of "No Operation" (NOP) instructions followed by an instruction that restores instruction 211 from temporary storage 204 back to its original location at the entry point of compiled method 201.

Hence, when compiled method 201 is subsequently invoked for the first time after the trap instruction is inserted, compiled method 201 is restored back to its original form. Note that subsequent invocations of compiled method 201 do not perform the trap instruction, and hence do not suffer any performance penalty.

Process of Inserting a Trap Instruction

Figure 3A:
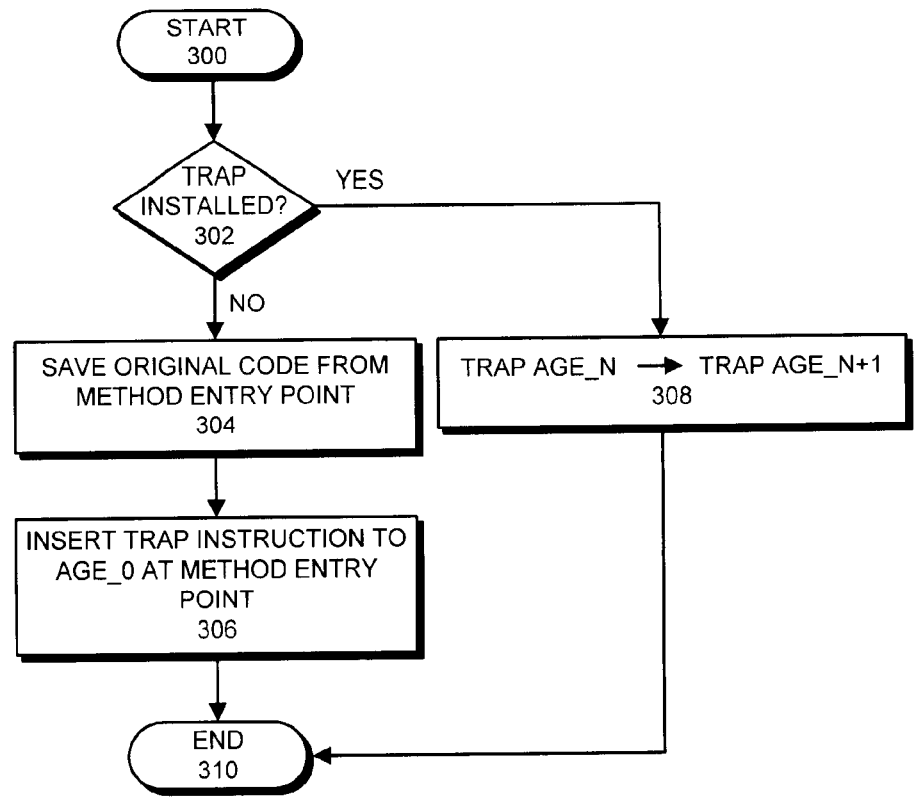
FIG. 3A is a flow chart illustrating the process of inserting a trap instruction into a compiled method in accordance with an embodiment of the present invention.
Figure 3B:
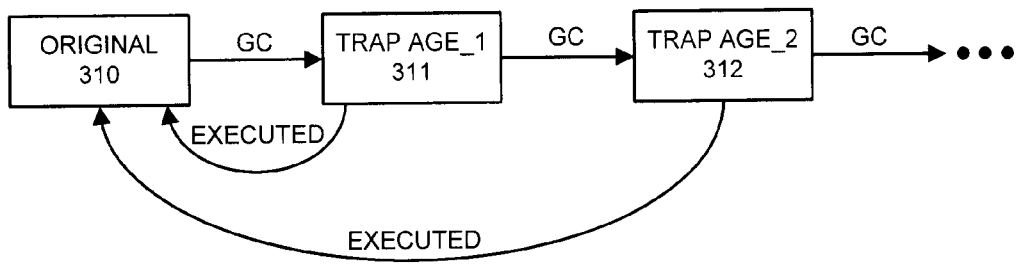
FIG. 3B is state diagram illustrating changes to a trap instruction in accordance with an embodiment of the present invention.

FIG. 3A is a flow chart illustrating the process of inserting a trap instruction into a compiled method 201 in accordance with an embodiment of the present invention. In one embodiment of the present invention, this process takes place during a garbage collection operation that removes unused objects from object heap 122.

When a compiled method 201 is encountered, the system first determines if a trap instruction has been installed into the compiled method 201 (step 302). If not, the system saves the original code (instruction 211) from the entry point of compiled method 201 in temporary storage 204 (step 304). The system then stores a trap instruction "TRAP AGE_0" to the entry point of compiled method 201 (step 306).

If in step 302 the system determines that a trap instruction has been installed, the system increments the pointer associated with the trap instruction (step 308). In this way, the pointer associated with the trap instruction keeps track of how many times the compiled method has been garbage collected without being executed. This allows the system to determine which compiled methods have been least recently used. A state diagram illustrating changes to the trap instruction appears in FIG. 3B.

Note that by keeping track of this information in the pointer associated with the trap instruction, no additional memory space is needed to keep track of this information. Also note that an upper limit can be established on the number of times this pointer can be incremented to prevent the trap instruction from trapping to an undefined memory location.

Process of Executing a Trap Instruction

Figure 4:
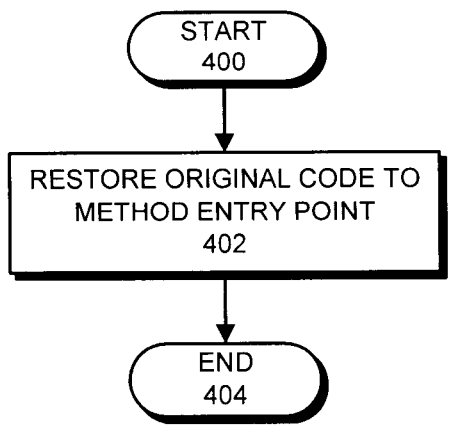
FIG. 4 is a flow chart illustrating the process of executing a trap instruction in accordance with an embodiment of the present invention.

FIG. 4 is a flow chart illustrating the process of executing a trap instruction in accordance with an embodiment of the present invention. As was mentioned above, execution of the trap instruction restores instruction 211 to its original location at the entry point of compiled method 201 (step 402), so that subsequent invocations of compiled method 201 suffer no performance penalty. Hence, the performance penalty for collecting this method usage information is simply the cost of restoring the original code the first time the compiled method is executed after garbage collection.

Process of Removing Compiled Methods

Figure 5:
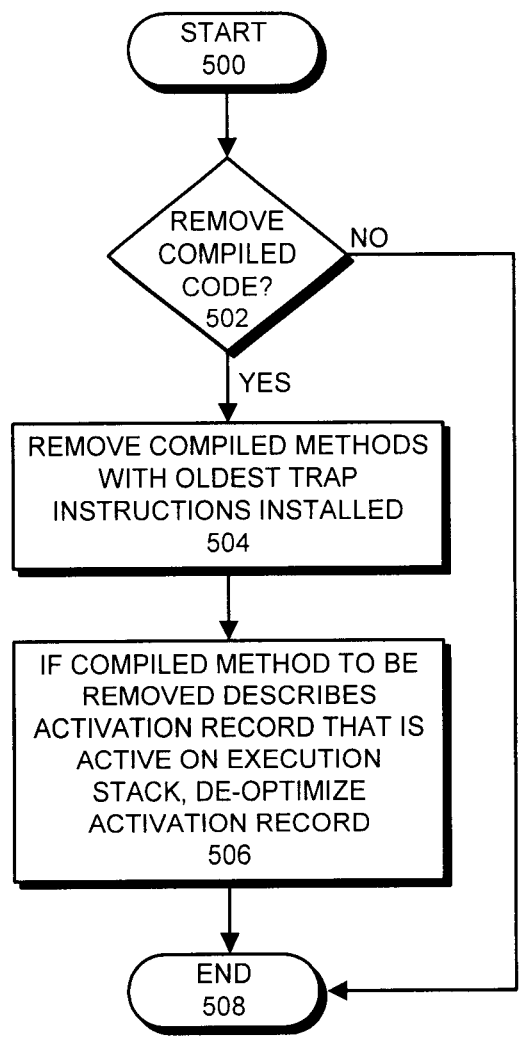
FIG. 5 is a flow chart illustrating the process of removing compiled methods from memory in accordance with an embodiment of the present invention.

FIG. 5 is a flow chart illustrating the process of removing compiled methods from memory in accordance with an embodiment of the present invention. During a periodic garbage collection operation, garbage collector 150 determines whether to remove compiled code from object heap 122 (step 502). This can happen for a number of reasons. For example, the amount of compiled code can exceed a total amount of memory allowed for compiled code, or the amount of live user data can grow to a point where it is desirable to trade compiled code for live user data.

If the system determines that no compiled code needs be removed, garbage collector 150 does not remove compiled code, and only performs normal garbage collection operations to remove unreachable objects from object heap 122.

Otherwise, if the system determines that compiled code needs to be removed, the system removes compiled methods with the oldest trap instructions (step 504). Note that during the garbage collection process, the system scans through all reachable objects within object heap 122. Hence, it is a simple matter to check the trap age of each compiled method and to remove compiled methods having a trap age that exceeds a threshold value.

Also note that if a compiled method to be removed describes an activation record that is active on the execution stack, the system may choose to de-optimize the activation record so that the activation record is described by the interpreter instead of by the compiled method (step 506). Alternatively, the system may simply choose not to remove a compiled method with an activation record that is active on the execution stack.

Note that when a method is compiled, the structure of the associated activation record on its execution stack is generally changed into an "optimized" form. Hence, when a compiled method is removed, and the compiled method describes an activation record that is active on the execution stack, the corresponding activation record must be de-optimized. This can be accomplished through a process described in U.S. Pat. No. 5,933,635, entitled, "Method and Apparatus for Dynamically Deoptimizing Compiled Methods," by inventors Urs Holze and Lars Bak, filed on Oct. 6, 1997 and issued on Aug. 3, 1999.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for gathering code usage information to facilitate removing compiled code that has not been recently used, wherein the method operates in a mixed-mode system that supports execution of both compiled code and interpreter code, the method comprising:

gathering usage information for compiled methods within an application while the application is executing;

identifying compiled methods to be removed based on the usage information; and removing the identified compiled methods so that interpreter code is executed for the compiled methods instead of compiled code;

wherein the method operates during a garbage collection operation that removes unreachable objects from the memory space of the application in addition to removing compiled methods;

whereby removing the compiled methods frees up the memory space used to store the compiled methods.

2. The method of claim 1,
wherein gathering the usage information involves keeping track of how many times each method has been garbage collected without being executed; and
wherein identifying the compiled methods to be removed involves identifying compiled methods that have been garbage collected more than a threshold number of times without being executed.

3. The method of claim 2, wherein keeping track of how many times a given method has been executed involves:
replacing an instruction in the given method with a trap instruction that causes the instruction to be restored to replace the trap instruction when the given method is executed after garbage collection; and
if the instruction has not been replaced since a preceding garbage collection operation, incrementing a counter associated with the trap instruction so that the counter indicates how many times the given method has been garbage collected without being executed.

4. The method of claim 3, wherein the counter is stored in a pointer associated with the trap instruction so that additional memory space is not required to store the counter.

5. The method of claim 1,
wherein if a given compiled method to be removed describes an activation record that is active on an execution stack, the method further comprises de-optimizing the activation record;
wherein de-optimizing the activation record involves converting the activation record from being described by the given compiled method to being described by the interpreter.

6. The method of claim 1, wherein if a given compiled method to be removed describes an activation record that is active on an execution stack, the method does not remove the given compiled method, thereby avoiding the expense of de-optimizing the activation record.

7. The method of claim 1, wherein the method further comprises:
determining a total amount of memory used by compiled methods; and
removing compiled methods if the total amount of memory used by compiled methods exceeds a threshold value.

8. The method of claim 1, wherein the method further comprises:
determining a total amount of memory used by live user data; and
removing compiled methods if the total amount of memory used by live user data exceeds a threshold value, thereby freeing additional memory space to accommodate live user data.

9. A computer-readable storage medium storing instructions that when executed by a computer cause the computer to perform a method for gathering code usage information to facilitate removing compiled code that has not been recently used, wherein the method operates in a mixed-mode system that supports execution of both compiled code and interpreter code, the method comprising:
gathering usage information for compiled methods within an application while the application is executing;
identifying compiled methods to be removed based on the usage information; and
removing the identified compiled methods so that interpreter code is executed for the compiled methods instead of compiled code;
wherein the method operates during a garbage collection operation that removes unreachable objects from the memory space of the application in addition to removing compiled methods;
whereby removing the compiled methods frees up the memory space used to store the compiled methods.

10. The computer-readable storage medium of claim 9,
wherein gathering the usage information involves keeping track of how many times each method has been garbage collected without being executed; and
wherein identifying the compiled methods to be removed involves identifying compiled methods that have been garbage collected more than a threshold number of times without being executed.

11. The computer-readable storage medium of claim 10, wherein keeping track of how many times a given method has been executed involves:
replacing an instruction in the given method with a trap instruction that causes the instruction to be restored to replace the trap instruction when the given method is executed after garbage collection; and
if the instruction has not been replaced since a preceding garbage collection operation, incrementing a counter associated with the trap instruction so that the counter indicates how many times the given method has been garbage collected without being executed.

12. The computer-readable storage medium of claim 11, wherein the counter is stored in a pointer associated with the trap instruction so that additional memory space is not required to store the counter.

13. The computer-readable storage medium of claim 9,
wherein if a given compiled method to be removed describes an activation record that is active on an execution stack, the method further comprises de-optimizing the activation record;
wherein de-optimizing the activation record involves converting the activation record from being described by the given compiled method to being described by the interpreter.

14. The computer-readable storage medium of claim 9, wherein if a given compiled method to be removed describes an activation record that is active on an execution stack, the method does not remove the given compiled method, thereby avoiding the expense of de-optimizing the activation record.

15. The computer-readable storage medium of claim 9, wherein the method further comprises:
determining a total amount of memory used by compiled methods; and
removing compiled methods if the total amount of memory used by compiled methods exceeds a threshold value.

16. The computer-readable storage medium of claim 9, wherein the method further comprises:
determining a total amount of memory used by live user data; and
removing compiled methods if the total amount of memory used by live user data exceeds a threshold value, thereby freeing additional memory space to accommodate live user data.

17. An apparatus for gathering code usage information to facilitate removing compiled code that has not been recently used, wherein the apparatus operates in a mixed-mode system that supports execution of both compiled code and interpreter code, the apparatus comprising:

a monitoring mechanism that is configured to gather usage information for compiled methods within an application while the application is executing; and a method removal mechanism that is configured to,
identify compiled methods to be removed based on the usage information, and to
remove the identified compiled methods so that interpreter code is executed for the compiled methods instead of compiled code,
whereby removing the compiled methods frees up the memory space used to store the compiled methods;

wherein the apparatus is part of a garbage collection mechanism that removes unreachable objects from the memory space of the application in addition to removing compiled methods.

18. The apparatus of claim 17,
wherein the monitoring mechanism is configured to keep track of how many times each method has been garbage collected without being executed; and
wherein the method removal mechanism is configured to identify compiled methods that have been garbage collected more than a threshold number of times without being executed.

19. The apparatus of claim 18, wherein the monitoring mechanism is configured to:
replace an instruction in a given method with a trap instruction that causes the instruction to be restored to replace the trap instruction when the given method is executed after garbage collection; and
if the instruction has not been replaced since a preceding garbage collection operation, to increment a counter associated with the trap instruction so that the counter indicates how many times the given method has been garbage collected without being executed.

20. The apparatus of claim 19, wherein the counter is stored in a pointer associated with the trap instruction so that additional memory space is not required to store the counter.

21. The apparatus of claim 17, further comprising a de-optimization mechanism;
wherein if a given compiled method to be removed describes an activation record that is active on an execution stack, the de-optimization mechanism is configured to de-optimize the activation record;
wherein de-optimizing the activation record involves converting the activation record from being described by the given compiled method to being described by the interpreter.

22. The apparatus of claim 17, wherein if a given compiled method to be removed describes an activation record that is active on an execution stack, the method removal mechanism is configured not to remove the given compiled method, thereby avoiding the expense of de-optimizing the activation record.

23. The apparatus of claim 17, wherein the method removal mechanism is additionally configured to:
determine a total amount of memory used by compiled methods; and to
remove compiled methods if the total amount of memory used by compiled methods exceeds a threshold value.

24. The apparatus of claim 17, wherein the method removal mechanism is additionally configured to:
determine a total amount of memory used by live user data; and to
remove compiled methods if the total amount of memory used by live user data exceeds a threshold value, thereby freeing additional memory space to accommodate live user data.

* * * * *